United States Patent
Sato et al.

(10) Patent No.: US 10,884,440 B2
(45) Date of Patent: Jan. 5, 2021

(54) CONTROL APPARATUS FOR THERMAL SENSATION PROVIDING DEVICE

(71) Applicant: ALPS ALPINE CO., LTD., Tokyo (JP)

(72) Inventors: Kunio Sato, Miyagi (JP); Toshihiko Saito, Miyagi (JP); Hajime Shikata, Miyagi (JP); Katsunari Sato, Nara (JP)

(73) Assignee: ALPS ALPINE CO., LTD., Tokyo (JP)

( * ) Notice: Subject to any disclaimer, the term of this patent is extended or adjusted under 35 U.S.C. 154(b) by 86 days.

(21) Appl. No.: 16/380,022

(22) Filed: Apr. 10, 2019

(65) Prior Publication Data
US 2019/0317535 A1 Oct. 17, 2019

(30) Foreign Application Priority Data
Apr. 16, 2018 (JP) .................................. 2018-078544

(51) Int. Cl.
| | |
|---|---|
| *G05D 23/00* | (2006.01) |
| *G05D 23/19* | (2006.01) |
| *G06F 9/30* | (2018.01) |
| *G06F 1/20* | (2006.01) |

(52) U.S. Cl.
CPC ......... *G05D 23/1927* (2013.01); *G06F 1/206* (2013.01); *G06F 9/30003* (2013.01)

(58) Field of Classification Search
None
See application file for complete search history.

(56) References Cited

U.S. PATENT DOCUMENTS

| | | | |
|---|---|---|---|
| 2017/0212589 A1* | 7/2017 | Domenikos | ............. G06F 3/016 |
| 2018/0267609 A1* | 9/2018 | Strese | ................. G06F 3/03543 |

FOREIGN PATENT DOCUMENTS

JP    2017-146830    8/2017

* cited by examiner

*Primary Examiner* — Paul B Yanchus, III
(74) *Attorney, Agent, or Firm* — IPUSA, PLLC

(57) ABSTRACT

A control apparatus for controlling a thermal sensation providing device that provides a thermal sensation to an object coming in contact with a virtual material includes a database configured to store first information indicative of a relationship between a type of virtual material and a speed of a temperature change during a first period that starts at a commencement of providing the thermal sensation and that ends at a lapse of a first time length from the commencement, and a temperature control unit configured to control a temperature provided by the thermal sensation providing device during the first period based on the first information.

12 Claims, 5 Drawing Sheets

THERMAL SENSATION PROVIDING SYSTEM

CONTROL APPARATUS FOR THERMAL SENSATION PROVIDING DEVICE

BACKGROUND OF THE INVENTION

1. Field of the Invention

The disclosures herein relate to a control apparatus, a thermal sensation providing apparatus, a thermal sensation providing system, a control method, and a computer-readable medium.

2. Description of the Related Art

There is a known technology in which a thermal sensation providing unit (e.g., Peltier device) is used to provide a thermal sensation ("cold" or "hot") for a contact body (e.g., user's finger) coming in contact with a contact surface of the thermal sensation providing unit.

For example, Patent Document 1 discloses utilizing thermal sensation reproduction parameters to adjust a temperature that is presented to a user skin.

Thermal sensation providing devices known in the art are not satisfactorily capable of representing a difference between materials. A human can differentiate between materials when touching metal, glass, or wood at a temperature of 22 degrees Celsius, for example. Thermal sensation providing devices known in the art are not highly capable of presenting a difference in materials that can be differentiated by humans.

There may be a need for a control apparatus, a thermal sensation providing apparatus, a thermal sensation providing system, a control method, and a recording medium that can present a difference between materials through temperature changes.

RELATED-ART DOCUMENTS

Patent Document

[Patent Document 1] Japanese Patent Application Publication No. 2017-146830

SUMMARY OF THE INVENTION

It is a general object of the present invention to provide a control apparatus that substantially obviates one or more problems caused by the limitations and disadvantages of the related art.

According to an embodiment, a control apparatus for controlling a thermal sensation providing device that provides a thermal sensation to an object coming in contact with a virtual material includes a database configured to store first information indicative of a relationship between a type of virtual material and a speed of a temperature change during a first period that starts at a commencement of providing the thermal sensation and that ends at a lapse of a first time length from the commencement, and a temperature control unit configured to control a temperature provided by the thermal sensation providing device during the first period based on the first information.

According to at least one embodiment, a difference between materials can be presented through temperature changes.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, the embodiments will be described with reference to the accompanying drawings. In the specification and drawings, elements having substantially the same functions or configurations are referred to by the same numerals, and a duplicate description thereof may be omitted.

<Schematic Configuration of Thermal Sensation Providing System>

Figure 1:
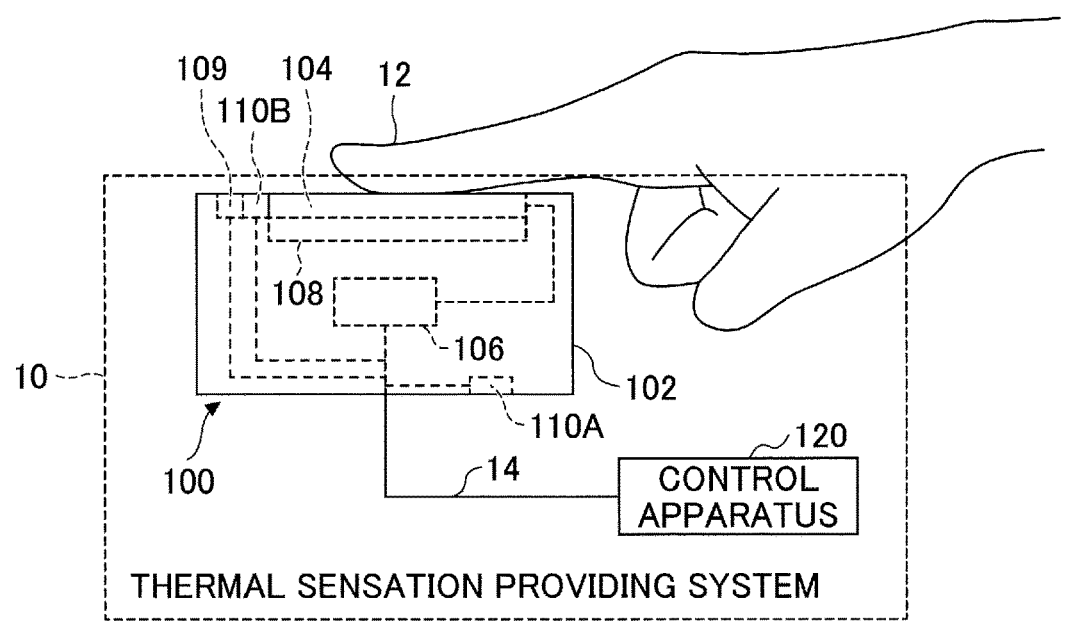
FIG. 1 is a drawing illustrating an example of the schematic configuration of a thermal sensation providing system according to an embodiment.

FIG. 1 is a drawing illustrating an example of the schematic configuration of a thermal sensation providing system 10 according to a present embodiment. The thermal sensation providing system 10 is capable of providing a cold or warm sensation to a user finger 12 when the user finger 12 is placed in contact with a Peltier device 104 of a thermal sensation providing apparatus 100. As illustrated in FIG. 1, the thermal sensation providing system 10 includes the thermal sensation providing apparatus 100 and a control apparatus 120. The thermal sensation providing apparatus 100 and the control apparatus 120 are coupled to each other through a communication cable 14. In the following description, the thermal sensation providing system 10 will be described as one which provides a cold sensation. The thermal sensation providing system 10 may alternatively, or additionally, be configured to provide a warm sensation. Namely, the thermal sensation providing system 10 is not limited to a cold sensation providing system.

The thermal sensation providing apparatus 100 may be securely attached to the user finger 12 with a fastening means (e.g., rubber band) such that the user finger 12 is placed in contact with the cooling surface of the Peltier device 104. The thermal sensation providing apparatus 100 includes a case 102, a Peltier device 104, a driver circuit 106, a heat sink 108, a contact sensor 109, a thermometer 110A, and a thermometer 110B.

The case 102 accommodates and securely holds all the components. In the present embodiment, the case 102 is a cuboid shape. The case 102 may be made of a relatively hard material (e.g., resin or metal).

The Peltier device 104 is disposed such that the cooling surface (which is an example of a thermal sensation providing surface) is exposed from the case 102. The Peltier device 104 is an example of a thermal sensation providing unit. The surface of the Peltier device 104 opposite from the cooling surface is a heat dissipating surface. The Peltier device 104 receives a drive current from the driver circuit 106 to cool the cooling surface through a Peltier effect and to generate heat at the heat dissipating surface. With this arrangement, the Peltier device 104 provides a cold sensation to the user finger 12 coming in contact with the cooling surface.

The driver circuit 106 is embedded in the case 102. The driver circuit 106 supplies a drive current to the Peltier device 104 in response to a control signal supplied from the control apparatus 120, thereby controlling the operation of the Peltier device 104.

The heat sink 108 is a tabular member disposed in close contact with the heat dissipation surface of the Peltier device 104. The heat sink 108 is provided for the purpose of releasing heat generated at the heat dissipating surface of the Peltier device 104 to the outside of the thermal sensation providing apparatus 100 (i.e., to the atmosphere) when the cooling surface of the Peltier device 104 is cooled. The heat sink 108 is made of a material having relatively high heat dissipation property (e.g., aluminum or the like). Alternatively, the case 102 may be made of a material having relatively high heat dissipation property (e.g., aluminum or the like), and the Peltier device 104 may be kept in direct contact with the case 102. Such a configuration may allow the case 102 to serve as a heat sink. In this case, the thermal sensation providing apparatus 100 may not be provided with the heat sink 108.

The contact sensor 109 detects an event that the user finger 12 comes in contact with the Peltier device 104, followed by reporting the event to the control apparatus 120. The contact sensor 109 may be an electrostatic sensor capable of detecting a change in the capacitance of the Peltier device 104, or may be a temperature sensor capable of detecting a change in the temperature of the Peltier device 104.

The thermometer 110A measures an ambient temperature of the Peltier device 104 to supply an output to the control apparatus 120. The thermometer 110B measures the temperature of an object (i.e., the user finger 12) coming in contact with the Peltier device 104 to supply an output to the control apparatus 120.

The control apparatus 120 is capable of controlling the operation of the Peltier device 104 of the thermal sensation providing apparatus 100 from outside the thermal sensation providing apparatus 100. Specifically, the control apparatus 120 supplies control signals to the driver circuit 106 of the thermal sensation providing apparatus 100. With this arrangement, the driver circuit 106 supplies a drive current to the Peltier device 104 to drive the Peltier device 104. The control apparatus 120 may be a dedicated apparatus, or may be a general-purpose information processing apparatus such as a smartphone, a personal computer, or the like. The control apparatus 120 may supply control signals to the driver circuit 106 of the thermal sensation providing apparatus 100 through wired communication lines or through wireless communication (e.g., Bluetooth (registered trademark), Wi-Fi, NFC (Near Field Communication), or the like).

<Functional Configuration of Control Apparatus>

Figure 2:
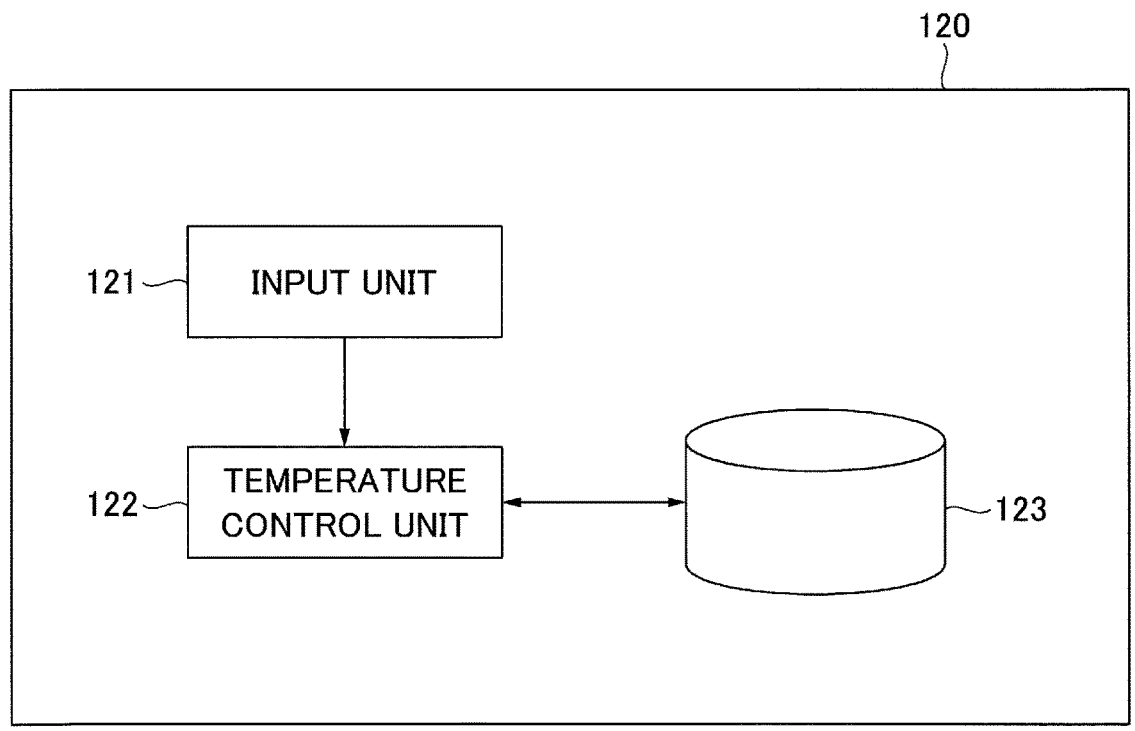
FIG. 2 is a drawing illustrating the functional configuration of a control apparatus included in the thermal sensation providing system of the embodiment.

FIG. 2 is a drawing illustrating the functional configuration of the control apparatus 120 included in the thermal sensation providing system 10. As illustrated in FIG. 2, the control apparatus 120 includes an input unit 121, a temperature control unit 122, and a database 123.

The input unit 121 receives information indicative of a virtual material for which a thermal sensation is provided by the thermal sensation providing apparatus 100. This information may be input by a user, or may be input in synchronization with video by a virtual reality displaying apparatus that operates in conjunction with the thermal sensation providing apparatus 100.

The database 123 contains first information indicative of the relationship between a type of virtual material such as metal, glass, wood, or the like and the speed of a temperature change during a first period that starts at the commencement of providing a thermal sensation and that ends at the lapse of a first time length from such a commencement. The first information specifies, for each type of virtual material, the speed of temperature changes during the first period that starts at the commencement of providing a thermal sensation through the Peltier device 104 and that ends at the lapse of a first time length such as 0.1 seconds, for example. The first information includes information regarding the magnitude of a drive current for making such temperature changes. The database 123 further contains second information indicative of the relationship between a type of virtual material and a controlled temperature during a second period immediately following the first period. The second information specifies, for each type of virtual material, a temperature that is provided during the second period starting at the lapse of the first period. The second information includes information regarding the magnitude of a drive current for providing such a temperature.

The temperature control unit 122 refers to the database 123, and supplies control signals to the driver circuit 106 of the thermal sensation providing apparatus 100 based on the first information and the second information, thereby controlling the operation of the Peltier device 104 of the thermal sensation providing apparatus 100.

The temperature control unit 122 may supply control signals to the driver circuit 106 to drive the Peltier device 104 such that the temperature of, the cooling surface of the Peltier device 104 becomes equal to a target temperature. When driving the Peltier device 104, the temperature control unit 122 may increase a drive current for driving the Peltier device 104 so as to lower the temperature of the cooling surface of the Peltier device 104.

The above-noted functions of the control apparatus 120 are implemented by a CPU (central processing unit, which is an example of a computer) executing programs stored in a memory (e.g., ROM (read only memory), RAM (random access memory), or the like) in the control apparatus 120. In this regard, the temperature control unit 122 in FIG. 2 may be such a CPU, which may execute programs stored in a memory denoted as 123, which also includes the previously noted database. These programs executed by the CPU may be pre-installed in, and provided with, the control apparatus 120, or may be provided from an outside source and installed in the control apparatus 120. In the latter case, these programs may be provided in an external memory medium (e.g., a USB memory, a memory card, a CD-ROM, or the like), or may be downloaded from a server on a network (e.g., the Internet or the like).

<Example of Control by Temperature Control Unit>

Figure 3:
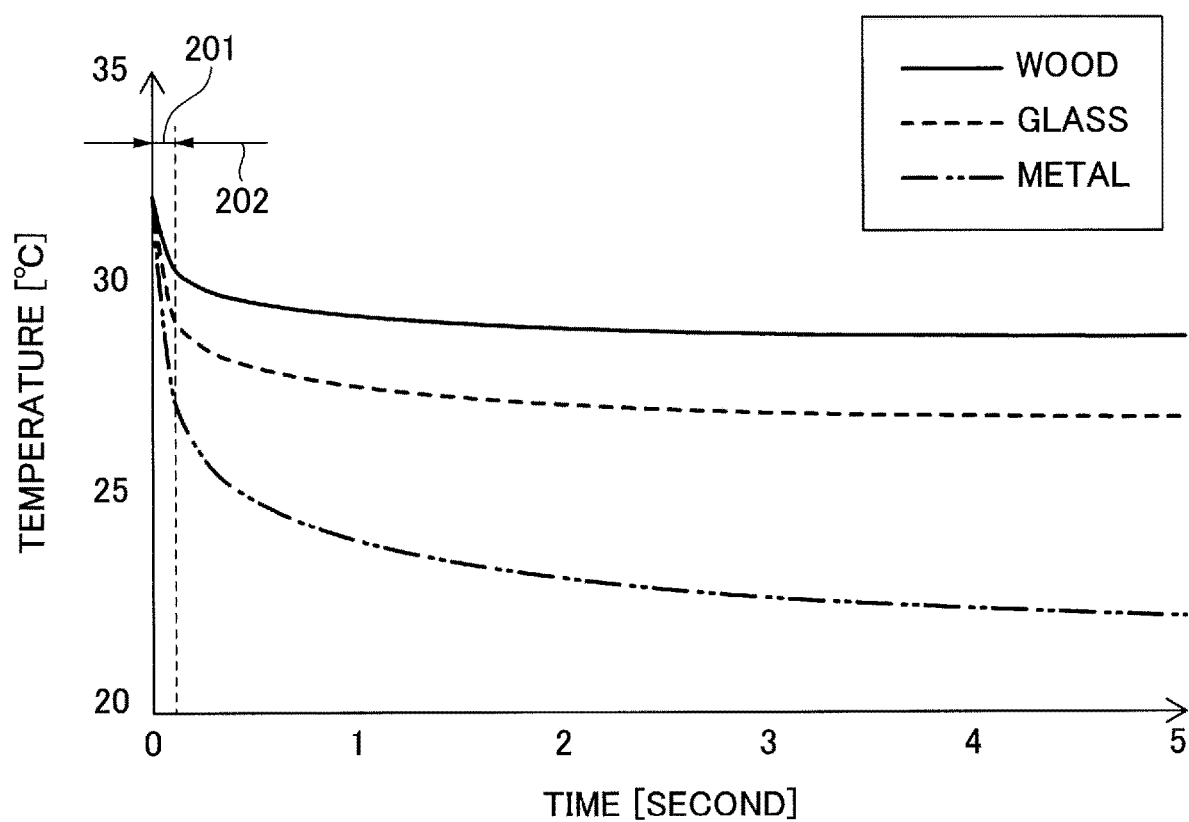
FIG. 3 is a drawing illustrating an example of the relationships between the passage of time and changes in skin temperature.

FIG. 3 is a drawing illustrating an example of the relationships between the passage of time and changes in the skin temperature. The example illustrated in FIG. 3 shows changes in the skin temperature when a human touches materials (wood, glass, and metal) under the conditions that the ambient temperature is 22 degrees Celsius and that the initial skin temperature is 32 degrees Celsius. The time period illustrated in FIG. 3 may be classified into two time periods 201 and 202 according to the way the skin temperature changes. The time period 201 is a very early period of time during which the skin temperature rapidly decreases. During this time period 201, heat is rapidly exchanged between the skin and the material, which provides the human with a strong thermal stimulus, resulting in the material temperature being instantly felt. The length of the time period 201 is approximately 0.1 second. The time period 202, which immediately follows the time period 201, is one in which a decrease in the skin temperature is slow. In this time period 202, the human receives a weak thermal stimulus, and does not feel any thermal stimulus after the material temperature and the skin temperature become approximately equal to each other.

As illustrated in FIG. 3, the speed of temperature changes during the time period 201 significantly differs depending on the type of material. This is because each material has a unique thermal conductivity coefficient, with the thermal conductivity coefficient of metal being higher than that of glass, and the thermal conductivity coefficient of glass being higher than that of wood.

As described above, different materials cause the skin temperature to change in different manners even when the same ambient temperature and the same initial skin temperature are given. Merely providing an ambient temperature does not enable a human to differentiate between virtual materials.

Figure 4:
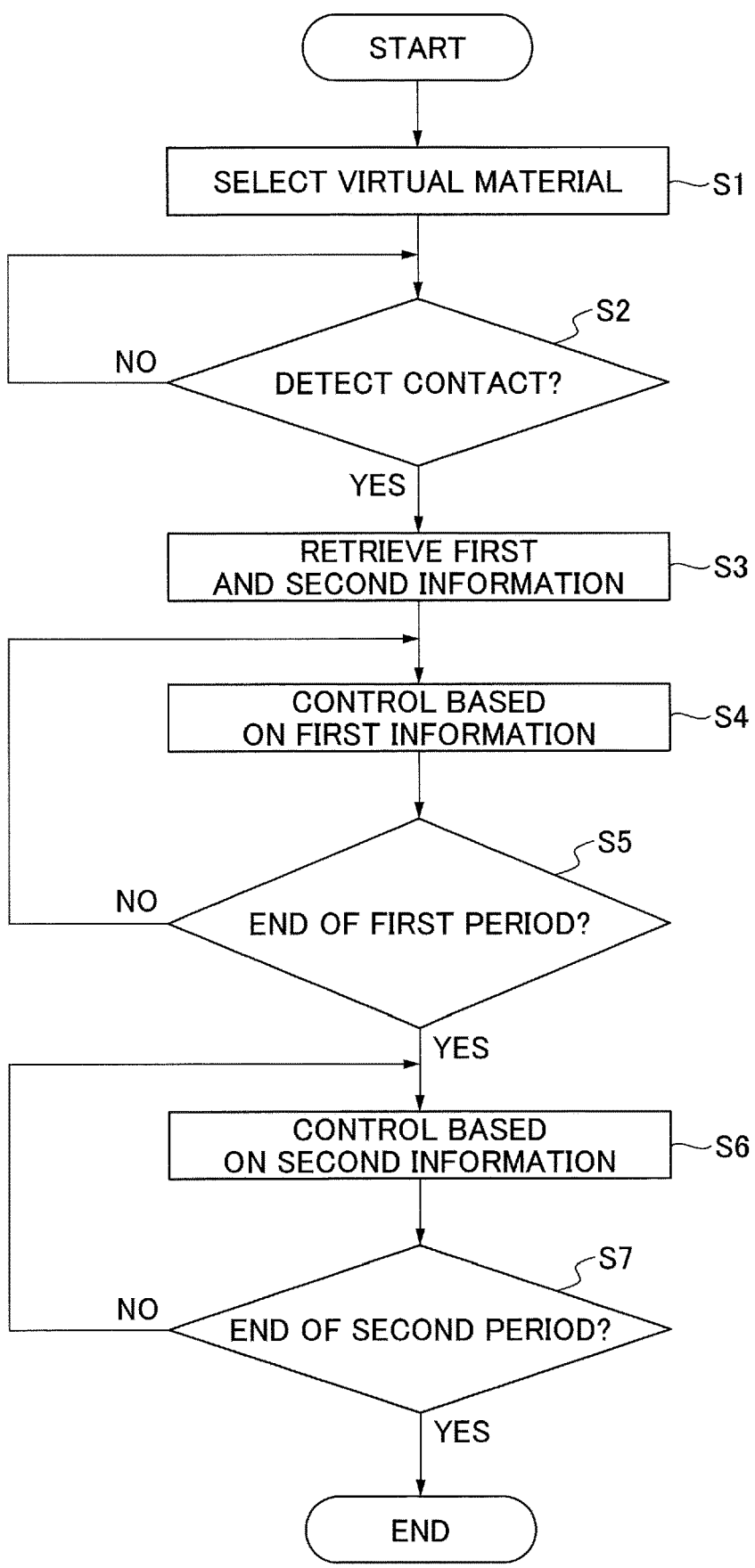
FIG. 4 is a flowchart illustrating the operation of the control apparatus included in the thermal sensation providing system of the embodiment.
Figure 5A:
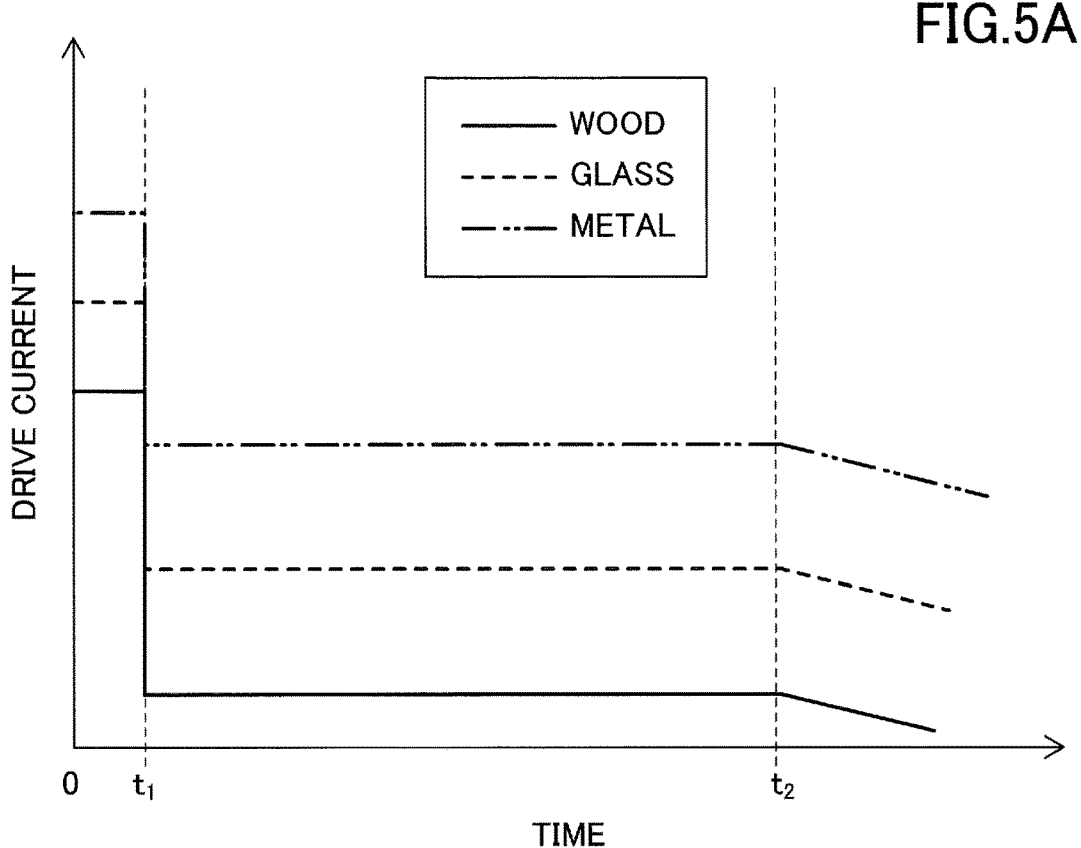
FIGS. 5A and 5B are drawings illustrating an example of the control operation performed by a temperature control unit included in thermal sensation providing system of the embodiment.
Figure 5B:
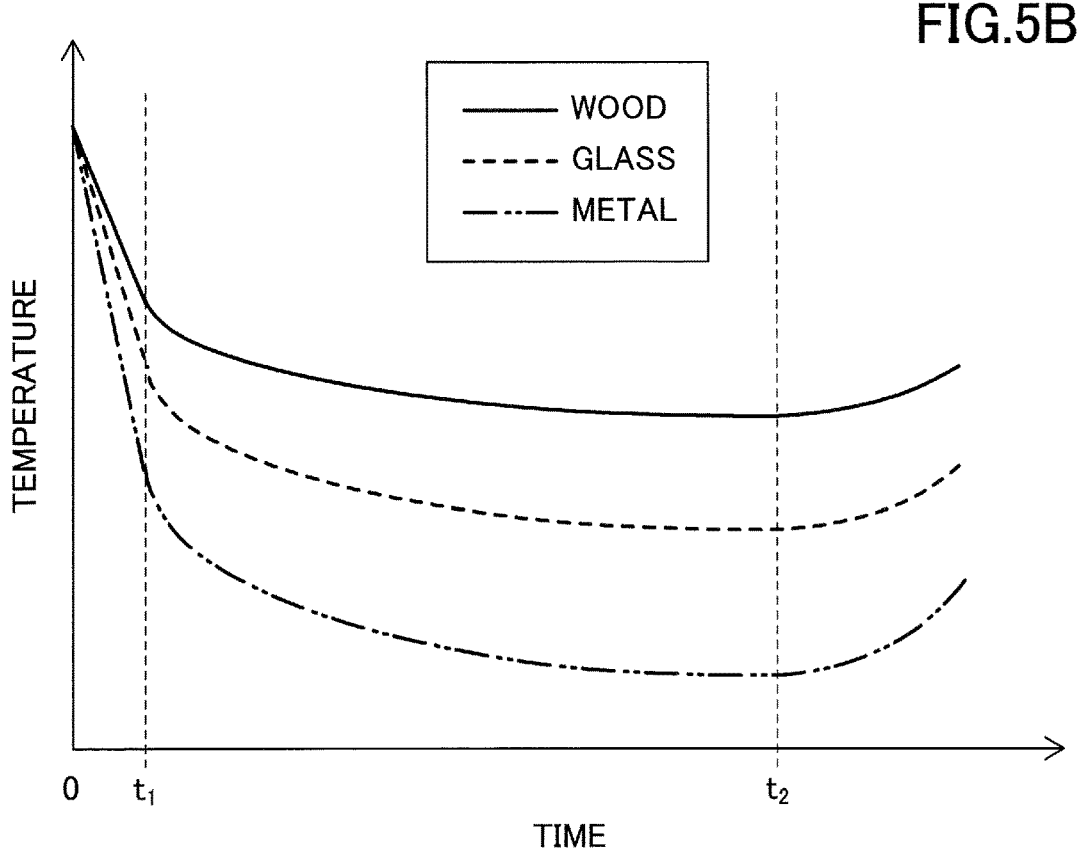

In the present embodiment, the control apparatus 120 performs the following control operations in order to reproduce changes in skin temperature as illustrated in FIG. 3. FIG. 4 is a flowchart illustrating the operation of the control apparatus 120. FIGS. 5A and 5B are drawings illustrating an example of the control operation performed by the temperature control unit 122. FIG. 5A illustrates changes in the drive current of the Peltier device 104 produced under the control of the temperature control unit 122. The vertical axis represents the drive current, and the horizontal axis represents the passage of time. FIG. 5B illustrates changes in the temperature of the cooling surface of the Peltier device 104 caused by changes in the drive current of the Peltier device 104 shown in FIG. 5A. The vertical axis represents temperature, and the horizontal axis represents the passage of time. In the examples illustrated in FIG. 5A and FIG. 5B, the ambient temperature as well as the temperature to be presented are the same between different virtual materials. For example, the ambient temperature is 32 degrees Celsius, and the temperature to be presented is 22 degrees Celsius.

First, the input unit 121 selects a virtual material for which the thermal sensation providing apparatus 100 provides a thermal sensation (step S1).

Next, the temperature control unit 122 uses the contact sensor 109 to detect whether the user finger 12 comes in contact with the Peltier device 104 (step S2). Upon detecting the contact, the temperature control unit 122 retrieves the first information and the second information regarding the virtual material from the database 123 (step S3).

Then, the temperature control unit 122 controls temperature based on the first information (step S4). As was previously described, the first information specifies, for each type of virtual material such as metal, glass, wood, or the like, the speed of temperature changes during the first period that starts at the commencement of providing a thermal sensation through the Peltier device 104 and that ends at the lapse of a first time length. The first information includes information regarding the magnitude of a drive current for making such temperature changes. In FIG. 5A and FIG. 5B, the point of time at which the first period ends is denoted as $t_1$. The first time length may be 0.1 seconds, for example. In the example illustrated in FIG. 5A, the drive current is set greater in the case of the virtual material being glass than in the case of the virtual material being wood, and is set greater in the case of the virtual material being metal than in the case of the virtual material being glass. As a result, as illustrated in FIG. 5B, during the first period that continues until the end of the first time $t_1$, temperature drops more rapidly in the case of reproducing glass than in the case of reproducing wood, and drops more rapidly in the case of reproducing metal than in the case of reproducing glass.

Upon the end of the first period (step S5), the temperature control unit 122 controls temperature based on the second information during the second period (step S6). As was previously described, the second information specifies, for each type of virtual material, a temperature that is provided after the lapse of the first period. The second information includes information regarding the magnitude of a drive current for providing such a temperature. In the example illustrated in FIG. 5A, the drive current is set greater in the case of the virtual material being glass than in the case of the virtual material being wood, and is set greater in the case of the virtual material being metal than in the case of the virtual material being glass. Namely, the temperature control unit 122 presents a lower temperature for glass than for wood, and presents a lower temperature for metal than for glass. As a result, temperature more gently changes in the second period than in the first period as illustrated in FIG. 5B. In this regard, the temperature change is more gentle for glass than for metal, and is more gentle for wood than for glass.

Upon the end of the second period (step S7), the temperature control unit 122 gradually lowers the drive current as illustrated in FIG. 5A, bringing the temperature control to an end. Consequently, the temperature gradually approaches the ambient temperature that was the initial temperature at the commencement of control, as illustrated in FIG. 5B. In FIG. 5A and FIG. 5B, the point of time at which the second period ends is denoted as $t_2$. The second period ends 1.5 seconds after the commencement of providing a thermal sensation, for example.

In this manner, the control apparatus 120 of the present embodiment controls the Peltier device 104 based on the first and second information associated with the type of virtual material. With this arrangement, the relationships illustrated in FIG. 3 can be highly accurately reproduced, as illustrated in FIG. 5B. Namely, a difference between materials can be presented to a user through temperature changes.

Differentiation between materials performed by humans relies on a strong thermal stimulus given during the first period, so that lowering a drive current during the second period does not undermine a feel of material. Lowering a drive current during the second period serves to reduce power consumption.

In the example illustrated in FIG. 5A, the drive current is supplied during the second period with respect to every virtual material. Alternatively, the drive current may not be supplied during the second period, depending on the ambient temperature, the temperature to be presented, and the type of material. In the case of touching real wood, for example, a thermal stimulus is felt immediately upon the contact, but almost no thermal stimulus may thereafter be felt in some cases. When such conditions are to be reproduced, the drive current may be set to zero during the second period. Such a control operation serves to further reduce power consumption.

Control of presented temperature by the temperature control unit 122 may preferably be performed not only based on the first and second information but also based on either one of, or both, the ambient temperature and the temperature of the object such as the user finger 12 coming in contact with the Peltier device 104. This is for the purpose of improving reproduction quality.

A drive current may be supplied to the Peltier device 104 even before the user finger 12 comes in contact with the Peltier device 104. However, using a detection of a contact as a trigger to start the control of temperature presentation can reduce power consumption.

<Variation of Thermal Sensation Providing Apparatus>

Figure 6:
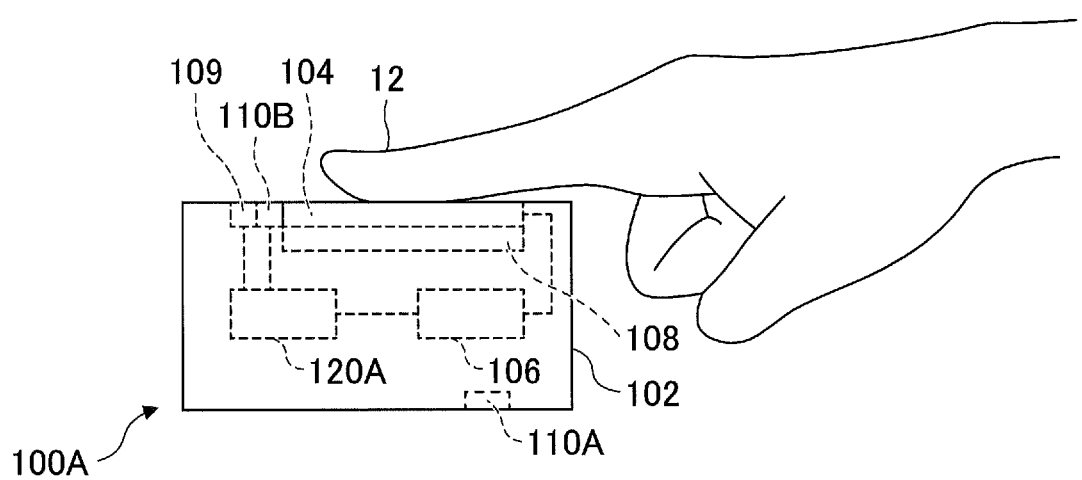
FIG. 6 is a drawing illustrating a variation of the thermal sensation providing system according to the embodiment.

FIG. 6 is a drawing illustrating a variation of the thermal sensation providing apparatus 100 according to the embodiment. A thermal sensation providing apparatus 100A illustrated in FIG. 6 differs from the thermal sensation providing apparatus 100 in that a control apparatus 120A is embedded as an internal unit. The control apparatus 120A has the same or similar functions as the control apparatus 120. Namely, the thermal sensation providing apparatus 100A is configured such that the locally provided control apparatus 120 controls a drive current for the Peltier device 104.

Although the embodiments of the present invention have been described, the present invention is not limited to these embodiments, but various variations and modifications may be made without departing from the scope of the present invention as set forth in the claims.

In the embodiments described heretofore, the present invention is applied to the thermal sensation providing apparatus 100 that provides a cold sensation. This is not a limiting example, and the present embodiment may be applicable to a thermal sensation providing apparatus that provides a warm sensation. Further, the present invention may be applied to a thermal sensation providing apparatus that provides both a cold sensation and a warm sensation. For example, the thermal sensation providing apparatus 100 described in the above-disclosed embodiment may supply a current to the Peltier device 104 in the opposite direction to the current for providing a cold sensation, thereby causing the Peltier device 104 to generate heat at the contact surface. This arrangement provides a warm sensation to the user finger 12 placed in contact with the contact surface. Similarly to the embodiment, temperature may be changed at the speed responsive to the type of virtual material during the first period, and a temperature responsive to the type of virtual material may preferably be presented during the second period, thereby providing a feel of differences between materials through temperature changes.

In the above-described embodiment, the drive current for the Peltier device 104 is constant during the second period. Alternatively, the drive current for the Peltier device 104 may be gradually decreased in a stepwise manner through two or more steps after the end of the first period.

The above-disclosed embodiment may be configured such that a temperature between the cold temperature and the initial skin temperature is presented after the cold sensation is presented. This control achieves a thermal sensation that provides an illusion of disengaging the finger.

The above-disclosed embodiment has been directed to an example in which the disclosed technology is applied to the thermal sensation providing apparatus 100 having the Peltier device 104. This is not a limiting example, and the disclosed technology may be applied to a thermal sensation providing apparatus having both the Peltier device 104 (or a different thermal sensation providing device) and a tactile sensation providing device (e.g., a vibration generating device or the like).

The present application is based on and claims priority to Japanese patent application No. 2018-078544 filed on Apr. 16, 2018, with the Japanese Patent Office, the entire contents of which are hereby incorporated by reference.

What is claimed is:

1. A control apparatus for controlling a thermal sensation providing device that provides a thermal sensation to an object coming in contact with a virtual material, comprising:
    a database configured to store first information indicative of a relationship between a type of virtual material and a speed of a temperature change during a first period that starts at a commencement of providing the thermal sensation and that ends at a lapse of a first time length from the commencement, and
    a temperature control unit configured to control a temperature provided by the thermal sensation providing device during the first period based on the first information,
    wherein the database is further configured to store second information indicative of a relationship between the type of virtual material and a controlled temperature during a second period immediately following the first period, and the temperature control unit is configured to control a temperature provided by the thermal sensation providing device during the second period based on the second information.

2. The control apparatus as claimed in claim 1, wherein the first information includes information indicative of a relationship between the type of virtual material and a magnitude of a drive current for driving the thermal sensation providing device during the first period.

3. The control apparatus as claimed in claim 1, wherein the second information includes information indicative of a relationship between the type of virtual material and a magnitude of a drive current for driving the thermal sensation providing device during the second period.

4. The control apparatus as claimed in claim 1, wherein the control of the temperature by the temperature control unit is further based on an ambient temperature of the thermal sensation providing device.

5. The control apparatus as claimed in claim 1, wherein the control of the temperature by the temperature control unit is further based on a temperature of the object coming in contact with the thermal sensation providing device.

6. The control apparatus as claimed in claim 1, wherein the temperature control unit is configured to start controlling the temperature upon a contact sensor detecting that the object comes in contact with the thermal sensation providing device.

7. The control apparatus as claimed in claim 6, wherein the contact sensor includes an electrostatic sensor.

8. The control apparatus as claimed in claim 6, wherein the contact sensor includes a temperature sensor.

9. A thermal sensation providing apparatus, comprising:
    the control apparatus of claim 1; and
    the thermal sensation providing device controlled by the control apparatus.

10. A thermal sensation providing system, comprising:
    the control apparatus of claim 1; and
    a thermal sensation providing apparatus that includes the thermal sensation providing device controlled by the control apparatus.

11. A method of controlling a thermal sensation providing device that provides a thermal sensation to an object coming in contact with a virtual material, comprising:
  referring to a database that stores first information indicative of a relationship between a type of virtual material and a speed of a temperature change during a first period that starts at a commencement of providing the thermal sensation and that ends at a lapse of a first time length from the commencement,
  controlling a temperature provided by the thermal sensation providing device during the first period based on the first information,
  referring to a database that stores second information indicative of a relationship between the type of virtual material and a controlled temperature during a second period immediately following the first period, and
  controlling a temperature provided by the thermal sensation providing device during the second period based on the second information.

12. A non-transitory computer-readable medium having a program embedded therein for causing a computer to control a thermal sensation providing device that provides a thermal sensation to an object coming in contact with a virtual material, the program causing the computer to perform:
  referring to a database that stores first information indicative of a relationship between a type of virtual material and a speed of a temperature change during a first period that starts at a commencement of providing the thermal sensation and that ends at a lapse of a first time length from the commencement,
  controlling a temperature provided by the thermal sensation providing device during the first period based on the first information,
  referring to a database that stores second information indicative of a relationship between the type of virtual material and a controlled temperature during a second period immediately following the first period, and
  controlling a temperature provided by the thermal sensation providing device during the second period based on the second information.

\* \* \* \* \*